UNITED STATES PATENT OFFICE.

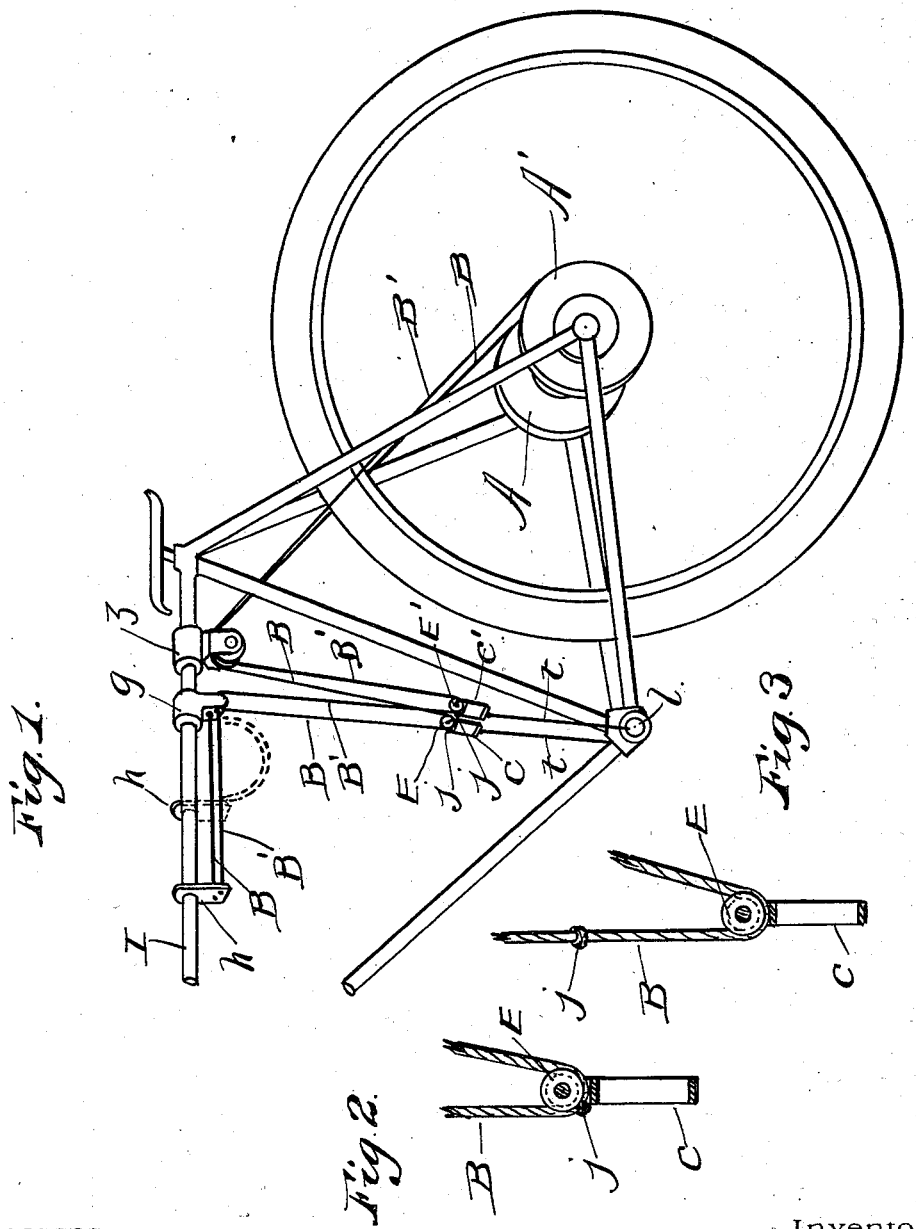

DEXTER M. SMALL, OF PROVIDENCE, RHODE ISLAND.

BICYCLE.

SPECIFICATION forming part of Letters Patent No. 723,934, dated March 31, 1903.

Application filed April 22, 1898. Serial No. 678,516. (No model.)

*To all whom it may concern:*

Be it known that I, DEXTER M. SMALL, of the city and county of Providence, in the State of Rhode Island, have invented an Improvement in Bicycles, Relating to the Propelling Mechanism, my object being to supersede cranks, sprocket-wheels, and gears of every description by a simple device which preserves the natural motion of the feet, while permitting untrammeled freedom as to distance and direction, also enabling the rider to easily vary the power (or what corresponds to the gear) without stopping.

In the accompanying drawings, which form a part of this specification, Figure 1 is a perspective view of my device in connection with a portion of the frame and rear wheel of a bicycle. Fig. 2 is an enlarged vertical section through one of the pedals C, showing pulley E secured to top thereof, with driving-cord B passing beneath. Fig. 3 is another view of same, showing different position of stop J, or rather of the pedal in relation to stop.

A and A' are clutch-wheels (which can be of any common or desired construction) made to engage with, so as to turn forward, the rear wheel of the bicycle as the driving cords, chains, or straps B and B' are alternately drawn downward by the feet in the pedals C and C', springs or other suitable means being employed to turn each clutch-wheel back into position and take up the slack cord as soon as the foot-pressure is removed, each of these clutch-wheels having one end of one of these cords secured to and passing once or more around it, passing thence over a pulley in support Z, thence down around another pulley E or E', secured to one of the pedals, and thence up through an aperture in guide G to an adjustable grip or support $h$, which can be moved along the bar I for conveniently making and adjusting slack in the cords in front of pulleys E E', whereby the stops J J (which may be simply knots) on the cords are permitted to remain in contact with the pulleys E E' until the slack is all taken up, the stops being large enough to prevent their passing under or by these pulleys. It is obvious that if the slack be all taken up at the start, as shown in Fig. 1, the stops will remain stationary while the pedals are depressed, as shown in Fig. 3, the effect being to just double the gear (or what corresponds thereto) by doubling the amount of driving-cord drawn from the rear of these pulleys, as in this case the whole amount necessary to permit the depression of the pedals must come from the clutch-wheels A A'. By sliding support $h$ toward guide G the gear is doubled only during the latter portion of the downward movement of the pedals, commencing where the slack (shown by the dotted lines) is taken up. This is a very important feature, since the leverage or power of the legs is much greater when nearly straight. When $h$ or its equivalent is moved close to guide G, the gear will obviously be reduced one-half throughout entire movement of the pedals, the slack being sufficient to permit the stops to remain in contact with pedals or pulleys E E' to the limit of their downward movement, one-half the amount of necessary cord being thus taken from this slack in front. The power or that which corresponds to the "gear" is thus varied at pleasure, the revolutions of the driving-wheel being doubled for the whole or such part of the foot motion as desired. To prevent the pedals from being carried up too far by the clutch-wheel springs drawing on the driving-cords, a cord $t$ $t$ of any desired length connects these pedals with bottom of frame at 1.

Not confining myself to any particular construction of parts, I claim as my invention—

1. In a bicycle of the class described, driving-cords B B', pedals C C', stops J J' secured to cords B B' in front of the pedals, pulleys E E', movable device $h$ connected with the frame and driving-cords, whereby the slack in these cords back of stops can be readily varied by the rider without stopping, to permit these stops to remain in contact with the pulleys, during the whole or any desired portion of the downward movement of the pedals, all constructed and combined with frame and drive-wheel so as to operate substantially as described.

2. Propelling mechanism for a bicycle, which consists of two clutch-wheels A A', flexible cords, straps or chains B B', stops J J', pulleys within support Z, pedals C C', pulleys E E', guide G, and support $h$, all in combination with the frame and hub or axle of drive-wheel, and constructed so as to operate substantially as described.

DEXTER M. SMALL.

Witnesses:
RICHMOND P. EVERETT,
OLIVER S. CRESSY.